United States Patent [19]

Calemma et al.

[11] Patent Number: 4,788,360
[45] Date of Patent: Nov. 29, 1988

[54] PROCESS FOR THE PRODUCTION OF REGENERATED HUMIC ACIDS FROM COAL

[75] Inventors: Vincenzo Calemma; Riccardo Rausa, both of Milan, Italy

[73] Assignee: Eniricerche S.p.A., Milan, Italy

[21] Appl. No.: 129,827

[22] Filed: Dec. 8, 1987

[30] Foreign Application Priority Data

Dec. 18, 1986 [IT] Italy ................................ 22744 A/86

[51] Int. Cl.$^4$ .............................................. C07C 59/00
[52] U.S. Cl. ..................................... 562/465; 562/475; 562/478
[58] Field of Search ........................ 562/465, 475, 478

[56] References Cited
PUBLICATIONS

Vorontsin, V. A. et al, Khim Tuerd. Topl (5)145–147, 1971.
Tengler, S. et al, Chemik 26(2) 65–67, 1973.
Smutkina, Z. S., Khim Tuerd. Topl. (4)100-2 1977.
Elishevich, A., et al, Khim. Tuerd, Topl (Moscow) (1) 58–62 1984.

Primary Examiner—Paul J. Killos
Attorney, Agent, or Firm—Hedman, Gibson, Costigan & Hoare

[57] ABSTRACT

A process is disclosed for the production of humic acids, which comprises an oxidation of coal in dry phase with oxygen or mixtures of oxygen and nitrogen in a fluidized-bed reactor, by using coal with a granulometry comprised within the range of from 100 μm to 3 mm and operating at a temperature comprised within the range of from 150° to 300° C., under a partial pressure of oxygen comprised within the range of from 1.1 abs.atm. to 10 abs.atm., for a contact time comprised within the range of from 30 minutes to 600 minutes.

10 Claims, No Drawings

PROCESS FOR THE PRODUCTION OF REGENERATED HUMIC ACIDS FROM COAL

The present invention relates to a process for the production of regenerated humic acids by strating from coal, by means of an oxidation in dry phase with oxygen, or mixtures of oxygen and nitrogen.

The humic acids can be used both as such, and as mixtures with fertilizers, already commonly used, in order to obtain additives for land fertilization.

Said acids can also be used for the removal of metals from waters.

Processes are known for the obtainment of humic acids, carried out by means of the oxidation of coal. Generally, said oxidation processes can be of three types:
- by means of the oxidation with nitric acid or nitrogen oxides (as disclosed, e.g., in Pat. No. UK-1283385);
- by means of the oxidation with oxygen in aqueous phase at an acidic pH (as disclosed, e.g., in patent application No. JP-70/10723, not examined);
- by means of the oxidation with oxygen in aqeuous phase at an alkaline pH (as disclosed, e.g., in the publication U.S. Bur. Mines Int. Circ. No. 8234, 1963, page 74).

Said processes show some disadvantages, which are specified hereinbelow.

For the oxidation with nitric acid or nitrogen oxides, we have:
- high consumptions of reactants, expensive, in particular as compared to the value of the obtained product;
- poor selectivity towards the formation of humic acids (humic acids/fulvic acids weight ratio not higher than 4);
- long reaction times for coal granulometries larger than 100 $\mu$m.

For the oxidation with oxygen in aqueous phase at a basic pH, we have:
- low maximum yields (not higher than 45%);
- high consumptions of alkali (coal/alkali ratio=from 1.5 to 2.5);
- high oxygen partial pressures (20–30 abs. atm);
- poor selectivity towards the formation of humic acids (maximum humic acids/fulvic acids weight ratio comprised within the range of from 2.5 to 3);
- development of $CO_2$, ranging from 15 to 25%.

For the oxidation with oxygen in aqueous phase at an acidic pH, we have:
- high consumption of expensive chemicals;
- long reaction times.

For this latter process, on which not much information is available, the selectivity and the yields are unknown; in any case, they are supposed to be rather low.

The present Applicant has surprisingly found that by carrying out the oxidation in dry phase with oxygen, or mixtures of oxygen and nitrogen under suitably determined operative conditions, the drawbacks shown by the processes of the prior art, hereinabove described, can be considerably reduced.

The process of the present invention, relating to the obtainment of humic acids, comprises an oxidation of coal in dry phase with oxygen or mixtures of oxygen and nitrogen, in particular air, inside a fluidized-bed reactor, carried out by using coal with a granulometry comprised within the range of from 100 $\mu$m to 3 mm, preferably of from 300 $\mu$m to 1 mm, and operating at a temperature comprised within the range of from 150° to 300° C., under a partial pressure of oxygen comprised within the range of from 1.1 abs. atm to 10 abs. atm, for a contact time comprised within the range of from 30 to 600 minutes.

The so-obtained products can be subsequently extracted from oxidated coal by means of an alkaline solution.

The coals used as the starting products from which the humic acids are obtained are preferably selected from those ranging from lignite to bituminous coals.

For the humic acids obtained from lignite, the oxydation is preferably carried out at a temperature comprised within the range of from 150° to 225° C., for a contact time comprised within the range of from 30 to 240 minutes.

In case lignite with a granulometry lower than 300 $\mu$m is used, the partial pressure of oxygen is preferably comprised within the range of from 1.1 to 2 abs. atm.

For humic acids obtained from sub-bituminous coals, the oxidation is preferably carried out at a temperature comprised within the range of from 175° to 250° C., and for a contact time of from 30 to 360 minutes.

In case a sub-bituminous coal with a granulometry lower than 300 $\mu$m is used, the partial pressure of oxygen is preferably comprised within the range of from 1.1 to 3 abs. atm.

For humic acids obtained from bituminous coals, the oxidation is preferably carried out at a temperature comprised within the range of from 200° to 270° C., and for a contact time of from 30 to 360 minutes.

In case a bituminous coal with a granulometry lower than 300 $\mu$m is used, the partial pressure of oxygen is preferably comprised within the range of from 1.1 to 5 abs. atm.

The following examples are supplied to better illustrate the invention, with in no way constituting a limitation thereof.

EXAMPLE 1

30 g of a Wyodak coal, having a granulometry comprised within the range of from 250 to 106 $\mu$m, previously dried, was charged to the reactor.

The reactor was then pressurized by feeding nitrogen at a suitable flowrate for the fluidization, and the temperature inside the reactor was increased to 180° C.

After this preliminary step, air was fed, at the same time stabilizing the temperature at 200° C.±3° C. for the desired time, after which the reaction was quenched by again feeding nitrogen, and cooling the equipment.

On the oxidated coal, the content of humic acids was then determined, by operating as follows.

10 g of sample and 150 ml of 1N NaOH were placed inside a flask, and refluxed under an inert atmosphere ($N_2$), with stirring, for 7 hours.

The reaction mixture was cooled and centrifuged to separate the residue.

The residue was washed once with 0.1N NaOH, and subsequently with water.

The washes were combined with the solution obtained from the centrifugation.

The residue was dried, and its weight and its content of organic matter were determined.

The humic acids contained in the solution were recovered by precipitation, by adding $H_2SO_4$ or HCl up to pH=2, and centrifuging. The solid was then dried, and its weight and its content of organic matter were determined.

The content of fulvic acids was determined by charging 10 g of oxidated coal with 130 ml of 0.01N HCl to a flask, and heating at 80° C., with stirring, for 3 hours, under an inert atmosphere of nitrogen. The residue was then washed with water, it was dried, and its weight was determined.

On the so obtained sample, the content of organic matter was determined, and, by difference with the content of organic matter of the coal used as the starting product, the content of fulvic adis was determined.

The reaction conditions were the following:
Temperature = 200° C.
Oxygen partial pressure = 1.1 abs. atm.
Granulometry = 250–106 μm The results obtained are reported in the following Table:

| Time (h) | Humic Acids % | Residue % | CO + $CO_2$ % | Fulvic Acids % |
|---|---|---|---|---|
| 0 | 10 | 86 | — | — |
| 0.5 | 29 | 69 | 2.5 | 2 |
| 1 | 51 | 47 | 4.0 | 2 |
| 2 | 59 | 38 | 6.6 | 5 |
| 4 | 69 | 29 | 9.4 | 3 |
| 6 | 73 | 24 | 12.1 | 9 |
| 8 | 75 | 21 | 12.8 | 5 |

(The values relating to humic acids, residue and fulvic acids relate to the organic matter contained in the oxidated coal, whilst the yields of CO+$CO_2$ are referred to the carbon content of the coal used as the starting material).

EXAMPLE 2

By using the same procedure as of Example 1, 30 g of Wyodak coal were oxidated under the following conditions:
Temperature = 200° C.
Oxygen partial pressure = 5 abs. atm
Granulometry = 250–106 μm
Oxidating agent = $N_2/O_2$ mixture at 50%

The results obtained are reported in the following Table:

| Time (h) | Humic Acids % | Residue % | CO + $CO_2$ % | Fulvic Acids % |
|---|---|---|---|---|
| 0 | 10 | 86 | — | — |
| 0.5 | 52 | 38 | 3.4 | 4 |
| 1 | 66 | 28 | 6.3 | 7 |
| 1.5 | 75 | 19 | 9.4 | 5 |
| 2.0 | 83 | 15 | 10.6 | 8 |
| 2.5 | 86 | 10 | 11.4 | 5 |
| 3.0 | 88 | 10 | 13.2 | 8 |

(The values relating to humic acids, residue and fulvic acids relate to the organic matter contained in the oxidated coal, whilst the yields of CO+$CO_2$ are referred to the carbon content of the coal used as the starting material).

EXAMPLE 3

By using the same procedure as of Example 1, 30 g of Wyodak coal were oxidated under the following conditions:
Temperature = 200° C.
Oxygen partial pressure = 5 abs. atm
Granulometry = 3 mm–1 mm
Oxidating agent = $N_2/O_2$ mixture at 50%

The results obtained are reported in the following Table:

| Time (h) | Humic Acids % | Residue % | CO + $CO_2$ % | Fulvic Acids % |
|---|---|---|---|---|
| 0 | 10 | 86 | — | — |
| 1 | 42 | 54 | 4.3 | 4 |
| 2 | 61 | 36 | 6.8 | 7 |
| 4 | 75 | 23 | 8.4 | 8 |
| 6 | 79 | 17 | 10.1 | 4 |
| 8 | 83 | 12 | 11.2 | 5 |
| 10 | 81 | 13 | 13.7 | 6 |

(The values relating to humic acids, residue and fulvic acids relate to the organic matter contained in the oxidated coal, whilst the yields of CO+$CO_2$ are referred to the carbon content of the coal used as the starting material).

EXAMPLE 4

By using the same procedure as of Example 1, 30 g of Illinois No. 6 coal were oxidated under the following conditions:
Temperature = 200° C.
Oxygen partial pressure = 1.1 abs. atm
Granulometry = 250–106 μm
Oxidating agent = Air The results obtained are reported in the following Table:

| Time (h) | Humic Acids % | Residue % | CO + $CO_2$ % | Fulvic Acids % |
|---|---|---|---|---|
| 0 | 3 | 95 | — | — |
| 1 | 11 | 86 | 3 | 3 |
| 2 | 24 | 74 | 5 | 7 |
| 4 | 61 | 36 | 8 | 8 |
| 6 | 71 | 25 | 10 | 5 |
| 8 | 73 | 20 | 12 | 5 |

(The values relating to humic acids, residue and fulvic acids relate to the organic matter contained in the oxidated coal, whilst the yields of CO+$CO_2$ are referred to the carbon content of the coal used as the starting material).

EXAMPLE 5

By using the same procedure as of Example 1, 30 g of Illinois No. 6 coal were oxidated under the following conditions:
Temperature = 200° C.
Oxygen partial pressure = 5 abs. atm
Granulometry = 250–106 μm
Oxidating agent = $N_2/O_2$ mixture at 50%

The results obtained are reported in the following Table:

| Time (h) | Humic Acids % | Residue % | CO + $CO_2$ % | Fulvic Acids % |
|---|---|---|---|---|
| 0 | 3 | 95 | — | — |
| 0.5 | 31 | 67 | 4 | 4 |
| 1 | 49 | 47 | 6 | 7 |
| 1.5 | 61 | 35 | 7 | 5 |
| 2.0 | 75 | 21 | 8 | 3 |
| 2.5 | 77 | 18 | 9 | 5 |
| 3.0 | 76 | 18 | 10 | 8 |

(The values relating to humic acids, residue and fulvic acids relate to the organic matter contained in the oxidated coal, whilst the yields of $CO+CO_2$ are referred to the carbon content of the coal used as the starting material).

EXAMPLE 6

By using the same procedure as of Example 1, 30 g of Illinois No. 6 coal were oxidated under the following conditions:

Temperature = 200° C.
Oxygen partial pressure = 5 abs. atm
Granulometry = 3-1 mm
Oxidating agent = $N_2/O_2$ mixture at 50%

The results obtained are reported in the following Table:

| Time (h) | Humic Acids % | Residue % | $CO + CO_2$ % | Fulvic Acids % |
|---|---|---|---|---|
| 0 | 3 | 95 | — | — |
| 1 | 10 | 87 | 5 | 5 |
| 2 | 23 | 73 | 8 | 3 |
| 4 | 41 | 54 | 10 | 2 |
| 6 | 57 | 41 | 11 | 4 |
| 8 | 68 | 29 | 12 | 6 |
| 10 | 75 | 21 | 13 | 6 |

(The values relating to humic acids, residue and fulvic acids relate to the organic matter contained in the oxidated coal, whilst the yields of $CO+CO_2$ are referred to the carbon content of the coal used as the starting material).

We claim:

1. Process for the production of humic acids by means of the oxidation of coal, characterized in that the oxidation is carried out in dry phase with oxygen or mixtures of oxygen and nitrogen, inside a fluidized-bed reactor, carried out by using coal with a granulometry comprised within the range of from 100 μm to 3 mm, and operating at a temperature comprised within the range of from 150° to 300° C., under a partial pressure of oxygen comprised within the range of from 1.1 abs. atm to 10 abs. atm, for a contact time comprised within the range of from 30 to 600 minutes.

2. Process according to claim 1, wherein the granulometry of coal is compresed within the range of from 300 μm to 1 mm.

3. Process according to claim 2, wherein coal is selected from coals ranging from lignite to bituminous coals.

4. Process according to claim 1, wherein the mixture of oxygen and nitrogen is air.

5. Process according to claim 3, wherein coal is lignite, and the oxidation is carried out at a temperature comprised within the range of from 150° to 225° C., for a contact time comprised within the range of from 30 to 240 minutes.

6. Process according to claim 5, wherein the granulometry of lignite is smaller than 300 μm, and the oxidation is carried out under an oxygen partial pressure comprised within the range of from 1.1 to 2 abs. atm.

7. Process according to claim 3, wherein coal is a sub-bituminous coal, and the oxidation is carried out at ta temperature comprised within the range of from 175° to 250° C., and for a contact time comprised within the range of from 30 to 360 minutes.

8. Process according to claim 7, wherein the granulometry of the sub-bituminous coal is smaller than 300 μm, and the oxidation is carried out under an oxygen partial pressure comprised within the range of from 1.1 to 3 abs. atm.

9. Process according to claim 3, wherein coal is a bituminous coal, and the oxidation is carried out at a temperature comprised within the range of from 200° to 270° C., and for a contact time comprised within the range of from 30 to 360 minutes.

10. Process according to claim 9, wherein the granulometry of the bituminous coal is smaller than 300 μm, and the oxidation is carried out under an ox partial pressure comprised within the range of from 1.1 to 5 abs. atm.

* * * * *